United States Patent
Recuero

(10) Patent No.: US 10,876,430 B2
(45) Date of Patent: Dec. 29, 2020

(54) MOUNT ASSEMBLY

(71) Applicant: ROLLS-ROYCE plc, London (GB)

(72) Inventor: Angel Recuero, Guadalajara (ES)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/861,755

(22) Filed: Jan. 4, 2018

(65) Prior Publication Data

US 2018/0187571 A1 Jul. 5, 2018

(30) Foreign Application Priority Data

Jan. 5, 2017 (GB) .................................. 1700100.9

(51) Int. Cl.
*F01D 25/28* (2006.01)
*F01D 25/24* (2006.01)
*F02C 7/32* (2006.01)
*F02C 7/20* (2006.01)
*F01D 25/12* (2006.01)

(52) U.S. Cl.
CPC ............. *F01D 25/28* (2013.01); *F01D 25/24* (2013.01); *F02C 7/20* (2013.01); *F02C 7/32* (2013.01); *F01D 25/12* (2013.01); *F05D 2220/32* (2013.01); *F05D 2260/213* (2013.01); *F05D 2300/50212* (2013.01); *Y02T 50/60* (2013.01)

(58) Field of Classification Search
USPC .................. 248/576, 579, 582, 609; 267/150
See application file for complete search history.

(56) References Cited

U.S. PATENT DOCUMENTS

| 2,489,981 | A | * | 11/1949 | Rose | B60N 2/38 248/582 |
|---|---|---|---|---|---|
| 2,554,045 | A | * | 5/1951 | Minor, Jr. | A63G 13/08 248/582 |
| 2,569,730 | A | * | 10/1951 | O'Donnell | B60N 2/38 248/397 |
| 3,115,323 | A | * | 12/1963 | Crandell | F16F 15/067 248/582 |
| 3,432,193 | A | * | 3/1969 | Oxford | A47C 3/02 248/160 |
| 6,098,949 | A | * | 8/2000 | Robinson | F16F 1/3732 248/609 |
| 2013/0154169 | A1 | * | 6/2013 | Myers | F01D 25/164 267/103 |

OTHER PUBLICATIONS

Ron Girffith Mahomet, Revolutionary New Free Piston Turbine Tractor, 1958, Ford Almanac (Year: 1958).*

* cited by examiner

*Primary Examiner* — Alfred J Wujciak
(74) *Attorney, Agent, or Firm* — Oliff PLC

(57) ABSTRACT

A mount assembly for attaching a heat exchanger to a casing of a gas turbine engine comprises a support bracket and a pin body, the pin body laterally moveable in use relative to the support bracket. The assembly further comprises a spring that in use can apply a restoring force to the pin body opposed to its lateral movement relative to the support bracket.

8 Claims, 3 Drawing Sheets

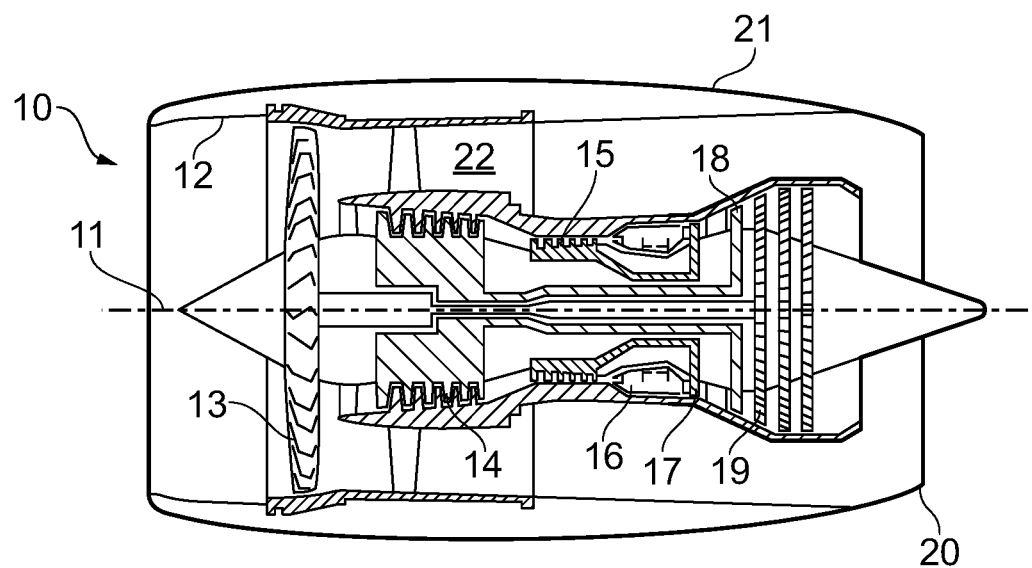
FIG. 1
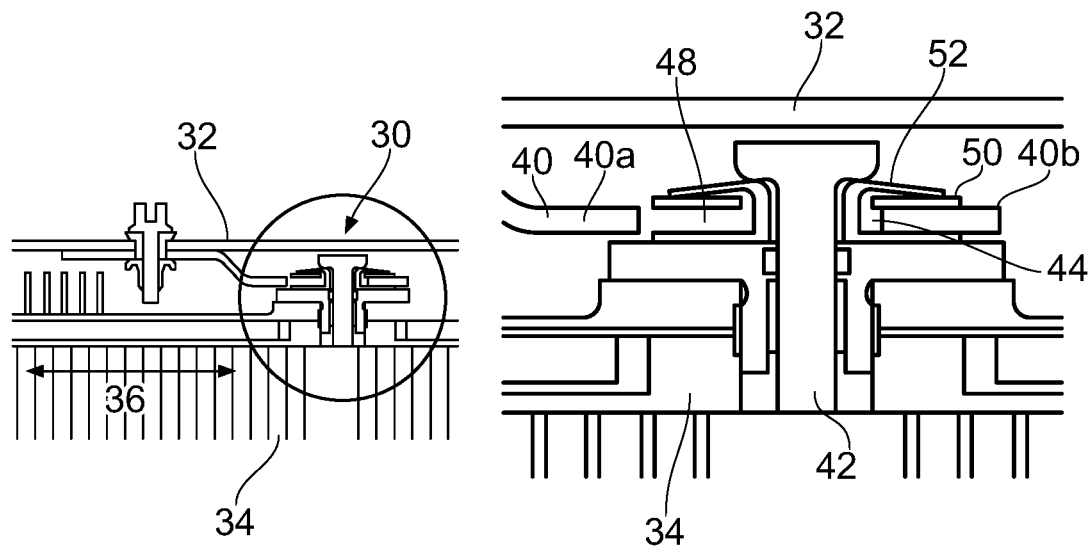
FIG. 2a
FIG. 2b

MOUNT ASSEMBLY

CROSS-REFERENCE TO RELATED APPLICATION

This application is based upon and claims the benefit of priority from British Patent Application No. 1700100.9 filed 5 Jan. 2017, the entire contents of which are incorporated herein.

BACKGROUND

1. Field of the Disclosure

The present disclosure concerns a mount assembly for mounting a unit to a substrate; particularly, but not exclusively, it concerns a mount assembly for mounting a heat exchanger to a casing of a gas turbine engine.

2. Description of the Related Art

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Accessory units provide power for aircraft hydraulic, pneumatic and electrical systems, in addition to providing various pumps and control systems for efficient engine operation. One known type of accessory unit is a variable-frequency starter-generator or VFSG.

The cooling for the VFSG is provided by a surface air-oil heat exchanger or SAOHE. The SAOHE is typically mounted on the inner surface of the fan casing so that the bypass airflow will provide cooling.

In use the SAOHE is subject to thermal expansion and contraction, which may be different from the expansion and contraction of the fan casing. The mounting features of the SAOHE must therefore be designed to accommodate this thermal expansion.

FIG. 2(a) shows a mount assembly 30 of known type for mounting a SAOHE 34 to a fan casing 32. The predominant direction of thermal expansion and contraction of the SAOHE in use is shown by the arrow 36.

The circled region of FIG. 2(a) is shown in more detail in FIG. 2(b). A bracket 40 is bolted to the fan casing 32. A bolt 42 secures a spacer 44 to the SAOHE 34. Between the spacer 44 and the bolt 42 head are a plain washer 50 and a disc spring 52. The plain washer 50 and the spacer 44 engage opposite surfaces of the bracket 40. As shown in the drawing, left 40a and right 40b sections of the bracket 40 delimit a lateral slot 48, aligned in the direction 36 of thermal expansion. In use, the spacer 44 can move within the slot 48 to accommodate thermal expansion and contraction of the SAOHE 34.

The disc spring provides an axial load on the bolted assembly, which helps to secure the mating components without requiring a high clamping force on the bolt. As an alternative to the disc spring, another resilient element may be used such as a spring washer, load spreading washer or Vesper® washer.

Disadvantages of this design include difficulty of assembly and the need for access from inside and outside the fan casing. Also, the available expansion is limited by the washer size, and the control of frictional force through washer pre-load is imprecise (because of variation in material properties and tolerance stack-up) which may be detrimental to the SAOHE life.

FIG. 3 shows another known design of mount assembly 132, in which nut-and-bolt assemblies 136 secure the mount assembly to the fan casing (not shown in FIG. 3) and a bolt 50 secures the SAOHE (not shown in FIG. 3) to the mount assembly. In this design of mount assembly, a bushing 52 is bonded to the fan casing, a rubber washer 54 is in contact with the outside surface of the fan casing and a steel washer 56 is in contact with the rubber washer. A pin (not shown) slides against this steel washer 56 and mates with the SAOHE at its opposite end. The securing bolt 50 is mounted from the inside (SAOHE side). An external bracket 60 prevents the pin from rotating so that the bolt can be removed when necessary Disadvantages of this design include difficulty in reassembly after maintenance, because the mount assembly does not centralise itself, and that the mount assembly forms the boundary between the inner and outer sides of the fan casing, but the sliding joints are not fire- or fluid-proof. The assemblies therefore do not provide a fire boundary across the fan casing.

It would be beneficial to have a mount arrangement for SAOHEs that mitigates or overcomes the disadvantages of known arrangements.

SUMMARY

According to a first aspect there is provided a mount assembly for attaching a heat exchanger to a casing of a gas turbine engine the mount assembly including: a support bracket and a pin body, the pin body laterally moveable in use relative to the support bracket; and a spring that in use can apply a restoring force to the pin body opposed to its lateral movement relative to the support bracket.

The skilled person will appreciate that except where mutually exclusive, a feature described in relation to any one of the embodiments may be applied mutatis mutandis to any other embodiment. Furthermore except where mutually exclusive any feature described herein may be applied to any embodiment and/or combined with any other feature described herein.

BRIEF DESCRIPTION OF THE DRAWINGS

Embodiments will now be described by way of example only, with reference to the Figures, in which:

FIG. 1 is a sectional side view of a gas turbine engine, as already described;

FIG. 2(a) is a schematic cross-sectional view of a known type of mount assembly for an SAOHE, as already described, and FIG. 2(b) shows in more detail the circled region in FIG. 2(a);

DETAILED DESCRIPTION OF THE EMBODIMENTS

Figure 3:
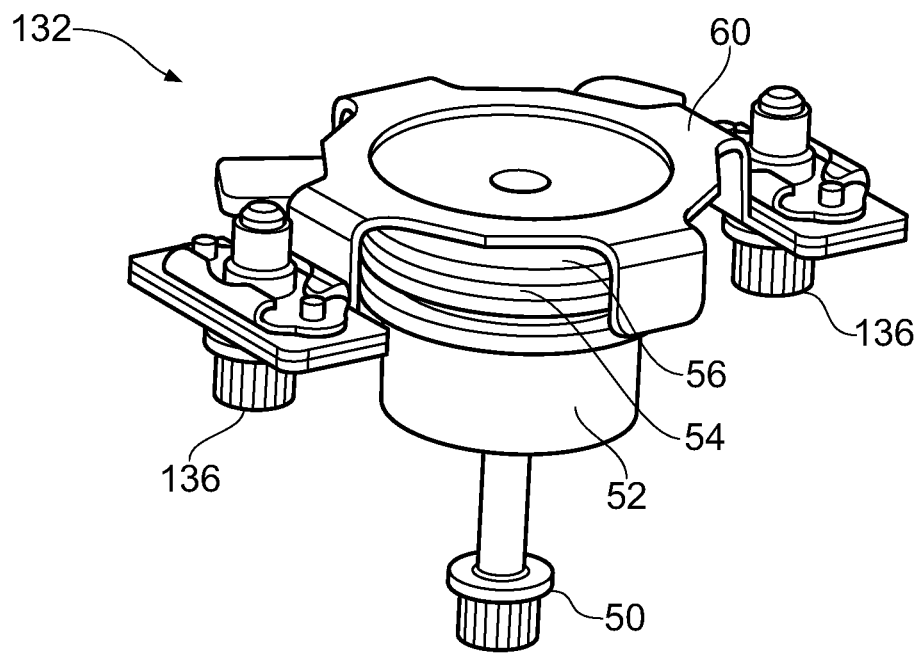
FIG. 3 is a schematic perspective view of another known type of mount assembly, as already described.
Figure 4:
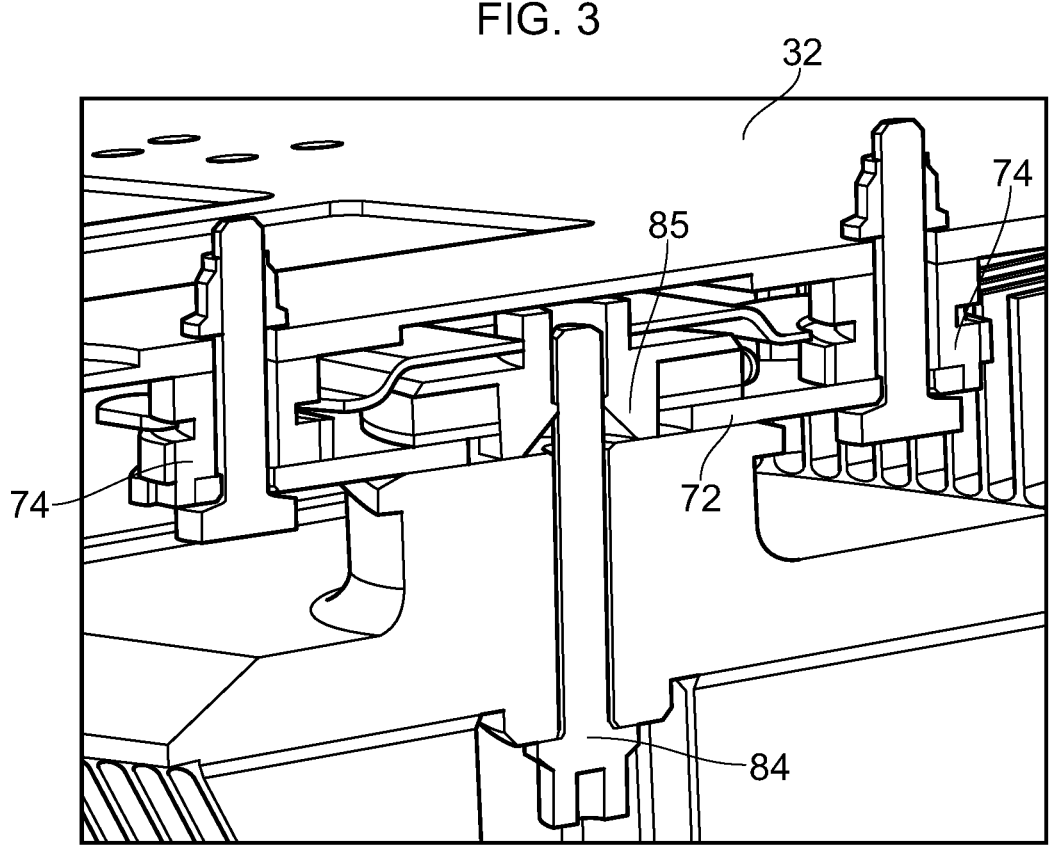
FIG. 4 is a schematic perspective view of a mount assembly for mounting a SAOHE to a fan casing.
Figure 5:
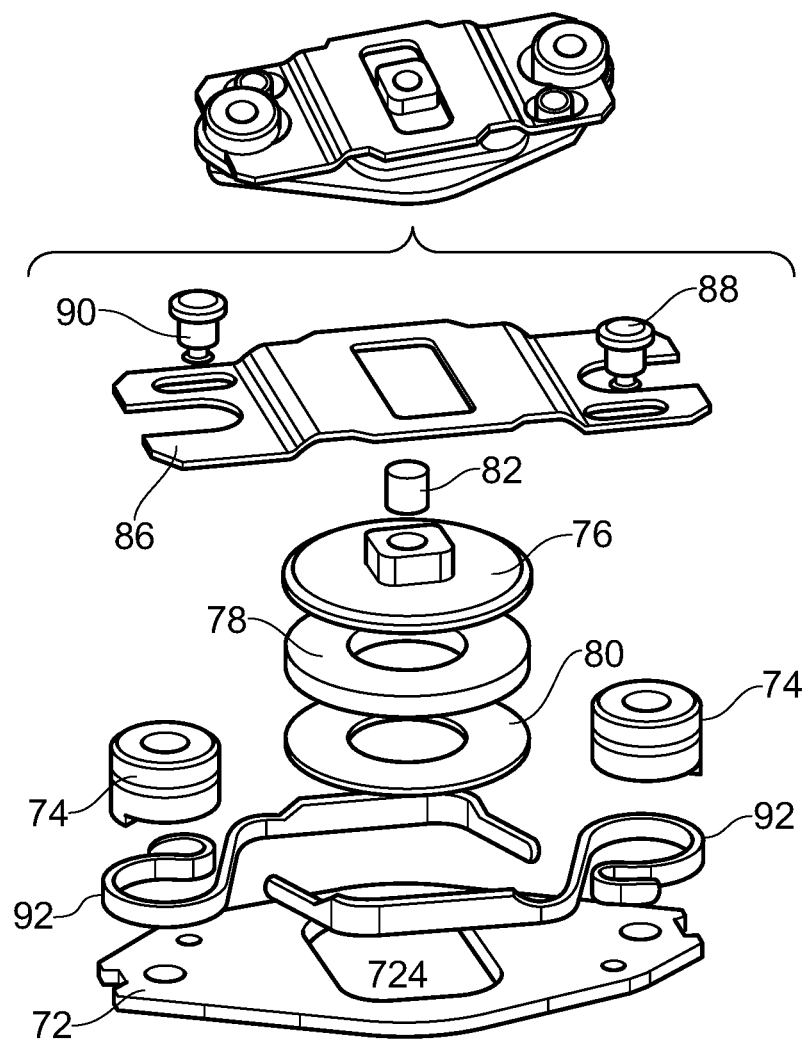
FIG. 5 is an exploded view of the mount assembly of FIG. 4.

The mount assembly shown in FIG. 4 and FIG. 5 comprises a support bracket 72 mounted to the fan casing 32 via two spacers 74. A pin body 76 is constrained within the assembly and can slide in a lateral direction relative to the support bracket 72. Interposed between the pin body 76 and the support bracket 72 are a rubber washer 78 and a steel washer 80. In use, the steel washer 80 slides against the support bracket 72 and the rubber washer is placed in compression to ensure correct location and contact between the two.

A threaded insert 82 is mounted in the pin body 76, and a bolt 84 engages with the threaded insert 82 to secure the SAOHE to the mount assembly. A tapered receiver 85 aids insertion of the bolt 84 into the insert 82 and helps to correct any misalignment.

A hole 724 in the support bracket 72 is sized to accommodate the predicted movement of the pin body 76 caused by build tolerance and thermal growth. An anti-rotation plate 86 is secured to the mount assembly by two rivets 88 and two bushings 90. This prevents the pin body 76 from rotating when the bolt 84 is being tightened.

Figure 6:
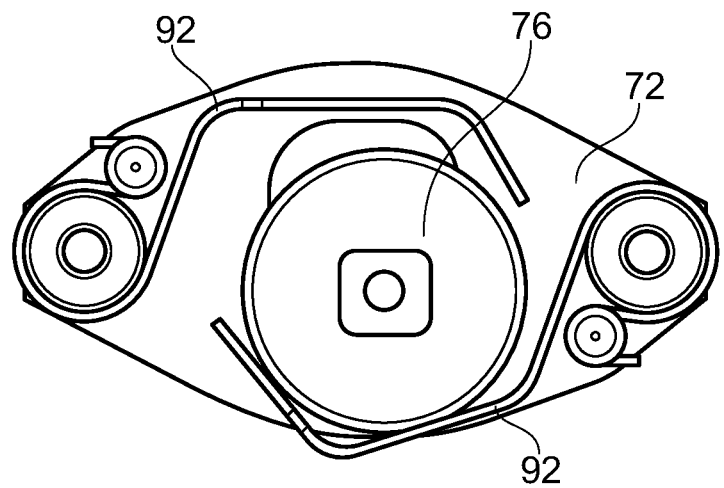
FIG. 6 shows displacement in the mount assembly of FIG. 4 in use.

The mount assembly of FIGS. 4 and 5 also incorporates two springs 92 mounted on the support plate 72. In use, these apply a restoring force to the pin body 76 when it is laterally deflected from its central rest position, as shown in FIG. 6. This simplifies reassembly when the SAOHE has been removed from the fan casing, because the pin body 76 will be centralised in the mount assembly.

Advantages of the mount assembly of FIGS. 4 and 5 over known arrangements include that access is only required from one side of the assembly (the SAOHE side); that the tapered receiver 85 accommodates mounting tolerances and aids assembly; that the mount assembly can be scaled to allow for any required amount of thermal displacement; and that the assembly can be modified to allow different degrees of freedom.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A mount assembly comprising:
a casing of a gas turbine engine;
a support bracket mounted to the casing;
a pin body, the pin body laterally moveable in use relative to the support bracket;
a spring that in use can apply a restoring force to the pin body opposed to its lateral movement relative to the support bracket; and
an anti-rotation device, the anti-rotation device comprising a plate including a slot, sides of the slot engaging a polygonal hub formed on the pin body.

2. The mount assembly of claim 1, in which the assembly comprises two springs.

3. The mount assembly of claim 2, in which the two springs act in use to center the pin body on the support bracket.

4. The mount assembly of claim 1, in which at least one washer is interposed between the pin body and the support bracket to ensure their correct location.

5. The mount assembly of claim 1, wherein:
the mount assembly is configured to attach a heat exchanger to the casing of the gas turbine engine;
the support bracket includes a hole, the hole having a hole axis; and
the pin body is laterally moveable in use relative to the support bracket, in a direction perpendicular to the hole axis; the mount assembly further comprising:
a bolt that passes through the hole of the support bracket and is connected to the pin body, the bolt being laterally moveable in the hole, in a direction perpendicular to a longitudinal axis of the bolt, in accordance with lateral movement of the pin body, the longitudinal axis of the bolt being parallel to the hole axis.

6. The mount assembly of claim 1, wherein:
the mount assembly is configured to attach a heat exchanger to the casing of the gas turbine engine;
the support bracket includes a hole, the hole having a hole axis perpendicular to a main surface of the support bracket;
the pin body is laterally moveable in use relative to the support bracket, in a direction perpendicular to the hole axis; and
the spring in use can apply the restoring force in the direction perpendicular to the hole axis.

7. A mount assembly configured to attach a heat exchanger to a casing of a gas turbine engine, the assembly comprising:
a support bracket for mounting on the casing of the gas turbine engine, the support bracket including a hole, the hole having a hole axis;
a pin body, the pin body being laterally moveable in use relative to the support bracket, in a direction perpendicular to the hole axis;
a bolt that passes through the hole of the support bracket and is connected to the pin body, the bolt being laterally moveable in the hole, in a direction perpendicular to a longitudinal axis of the bolt, in accordance with lateral movement of the pin body, the longitudinal axis of the bolt being parallel to the hole axis;

a spring that in use can apply a restoring force to the pin body opposed to its lateral movement relative to the support bracket; and an anti-rotation device, the anti-rotation device comprising a plate including a slot, sides of the slot engaging a polygonal hub formed on the pin body.

8. A mount assembly configured to attach a heat exchanger to a casing of a gas turbine engine, the assembly comprising:

a support bracket for mounting on the casing of the gas turbine engine, the support bracket including a hole, the hole having a hole axis perpendicular to a main surface of the support bracket;

a pin body, the pin body laterally moveable in use relative to the support bracket, in a direction perpendicular to the hole axis;

a spring that in use can apply a restoring force, in the direction perpendicular to the hole axis, to the pin body opposed to its lateral movement relative to the support bracket; and an anti-rotation device, the anti-rotation device comprising a plate including a slot, sides of the slot engaging a polygonal hub formed on the pin body.

\* \* \* \* \*